US009578457B2

(12) United States Patent
Sartini et al.

(10) Patent No.: US 9,578,457 B2
(45) Date of Patent: Feb. 21, 2017

(54) PRIVACY-BASED DEVICE LOCATION PROXIMITY

(71) Applicant: Verizon Patent and Licensing Inc., Basking Ridge, NJ (US)

(72) Inventors: Robert A. Sartini, Colorado Springs, CO (US); Jeffrey H. Swinton, Mendham, NJ (US); Paul T. Schultz, Colorado Springs, CO (US); Mark J. Hahn, Stow, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 305 days.

(21) Appl. No.: 13/629,954

(22) Filed: Sep. 28, 2012

(65) Prior Publication Data

US 2014/0095580 A1 Apr. 3, 2014

(51) Int. Cl.
*G06F 15/16* (2006.01)
*H04W 4/02* (2009.01)

(52) U.S. Cl.
CPC .............. *H04W 4/023* (2013.01); *H04W 4/028* (2013.01)

(58) Field of Classification Search
CPC ....... G06F 15/16; G06F 17/3005; H04W 4/02; H04W 4/023; H04W 4/028; H04W 64/00; H04W 4/021; H04W 4/206; H04W 12/02; H04W 72/121; H04L 65/403; H04L 65/40; H04L 51/20; H04L 1/1861; H04L 1/1893; H04L 67/22; H04L 12/2825; H04L 51/32; G06Q 20/12; G06Q 20/40; G06Q 30/0601

USPC ......................................................... 709/203
See application file for complete search history.

(56) References Cited

U.S. PATENT DOCUMENTS

| 7,100,204 | B1 * | 8/2006 | Myllymaki et al. ............ 726/22 |
| 8,117,341 | B2 * | 2/2012 | Matz ............................. 709/245 |
| 8,401,897 | B1 * | 3/2013 | Chatterjee .......... G06Q 30/0261 705/14.1 |
| 8,577,405 | B2 * | 11/2013 | Davis .................... H04W 4/001 455/456.3 |
| 2003/0020623 | A1 * | 1/2003 | Cao ........................ G01C 21/20 340/686.6 |
| 2003/0023726 | A1 * | 1/2003 | Rice et al. .................... 709/225 |

(Continued)

OTHER PUBLICATIONS

Chamberlain, "What is the best way to calculate the great circle distance (which deliberately ignores elevation differences) between 2 points?", Oct. 1996, as reproduced in Movable Type Scripts, GIS FAQ Q5:1: Great circle distance between 2 points, 5 pages.

(Continued)

*Primary Examiner* — Kevin Bates
*Assistant Examiner* — Ranjan Pant

(57) ABSTRACT

A server may receive a query from a query device. The query may include an identifier that identifies a user device, information regarding a geographic radius, and information regarding a geographic position. The server may determine a first proximity area based on the geographic radius and the geographic position indicated by the query. The server may determine a second proximity area that represents an area in which the user device may be included. The server may determine a value that indicates a likelihood that the first proximity area is within the second proximity area. The server may provide information to the query device indicating the value.

21 Claims, 11 Drawing Sheets

(56) References Cited

U.S. PATENT DOCUMENTS

| | | | | |
|---|---|---|---|---|
| 2007/0264974 A1* | 11/2007 | Frank | ........... | H04L 63/0407 |
| | | | | 455/411 |
| 2011/0047075 A1* | 2/2011 | Fourez | ........... | G06Q 20/32 |
| | | | | 705/44 |
| 2011/0113488 A1* | 5/2011 | Schultz | ........... | G06F 21/6245 |
| | | | | 726/21 |
| 2012/0276927 A1* | 11/2012 | Pitt | ........... | 455/456.2 |
| 2013/0066750 A1* | 3/2013 | Siddique | ........... | G06Q 10/0637 |
| | | | | 705/27.2 |
| 2013/0212176 A1* | 8/2013 | Koulomzin et al. | ........... | 709/204 |
| 2013/0275303 A1* | 10/2013 | Fiore et al. | ........... | 705/44 |
| 2013/0325503 A1* | 12/2013 | Abrahams et al. | ........... | 705/3 |

OTHER PUBLICATIONS

Wolfram Research, Inc. "Circle-Circle Intersection", 1999, 3 pages.

\* cited by examiner

PRIVACY-BASED DEVICE LOCATION PROXIMITY

BACKGROUND

Users sometimes use user devices to share geographic location information of a user device with other user devices or querying devices in order to receive information associated with the geographic location. Sharing excessive location information may pose privacy risks to a user, associated with a user device, while sharing insufficient location information may prevent the user from receiving information associated with the geographic location.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide information to identify the likelihood that a user device (e.g., a mobile phone, a laptop, a tablet device, a sensor, or some other type of mobile user device) is within a particular geographic proximity (e.g., within a particular radius of a particular geographic location). For example, the systems and/or methods may provide a confidence value (e.g., a percentage value from 0% to 100%) that describes the likelihood that the user device is within the particular geographic proximity.

Figure 1:
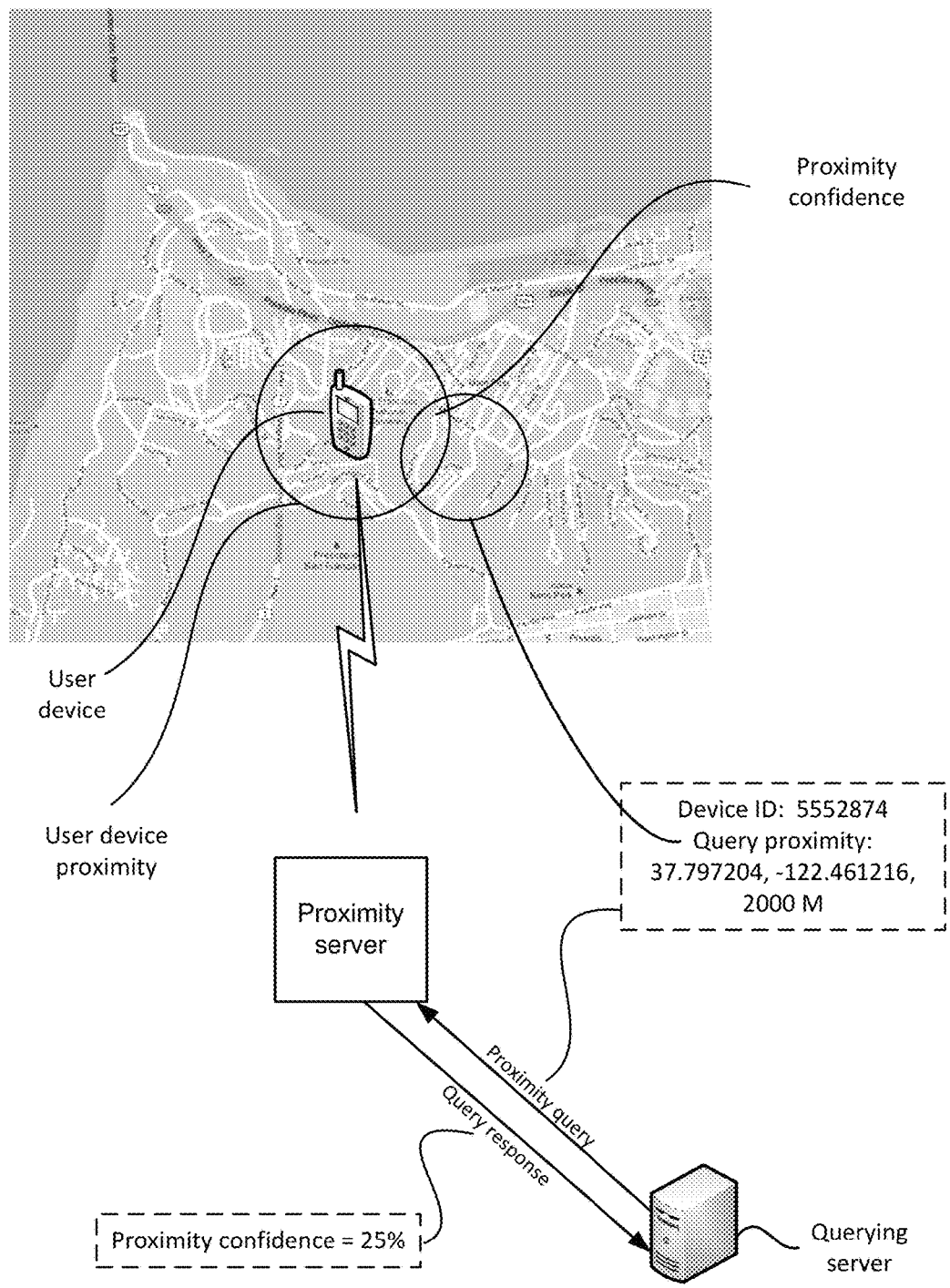
FIG. 1 illustrates an example overview of an implementation described herein.

FIG. 1 illustrates an example overview of an implementation described herein. As shown in FIG. 1, a querying device, such as a querying device (e.g., a mobile phone, a tablet device, a laptop computer, a desktop computer, a server device (also referred to as a "querying server"), etc.), may communicate with a proximity server to receive a confidence value relating to the likelihood that a particular user device is within a particular geographic proximity. For example, a querying server may provide the proximity server with a proximity query including a device identifier (ID) associated with an identifier of the user device and/or information regarding a query proximity such as a geographic radius (e.g., 2000 meters), and/or a geographic position such as longitude and latitude coordinates (e.g., 37.797204, −122.461216), an internet protocol (IP) address, or a cellular network device identifier. In some implementations, a particular application (e.g., a querying application, such as a fraud detection application), associated with the querying server, may cause the querying server to provide the proximity query to the proximity server.

As further shown in FIG. 1, the proximity server may identify a geographic proximity associated with the user device (e.g., user device proximity). In some implementations, the user device proximity may relate to a circular proximity having a center associated with a geographic position and a radius associated with a geographic radius. In some implementations, the geographic position and geographic radius of the user device may be based on information provided by a global positioning system (GPS) of the user device and/or based on information regarding cellular towers with which the user device is connected.

In some implementations, the user device proximity may be based on permissions information associated with the querying server. For example, user device proximity may be more accurate (i.e., have a smaller geographic radius) for querying servers having a particular permissions level, such as a "fully trusted" permissions level in relation to querying servers having some other permissions level, such as an "untrusted" permissions level.

In some implementations, the proximity server may identify a query proximity based on receiving the proximity query from the querying server. For example, the query proximity may relate to a circular proximity having a center corresponding to a geographic position and a radius corresponding to a geographic radius associated with the query proximity. As shown in FIG. 1, the proximity server may identify the user device proximity and the query proximity in relation to a geographic map. In some implementations, the proximity server may determine a proximity confidence value that describes the likelihood that the user device proximity is within the query proximity specified by the querying server.

As shown in FIG. 1, the proximity confidence value may relate to a shared portion of the user device proximity and of the query proximity. In the example shown in FIG. 1, the proximity server may calculate the proximity confidence value at 25% and provide the proximity confidence value to the querying server. In some implementations, the proximity confidence value may be based on permission levels provided by the user device. For example, as described above, the proximity server may increase or decrease the user device geographic radius (e.g., increase a measure of accuracy or decrease a measure of accuracy of the location of the user device and/or for the proximity location) for particular querying servers. As a result, a querying server may receive a proximity confidence value that describes a confidence level at which the user device is within the geographic proximity specified by the querying server and based on permission levels associated with the querying server.

While a particular example of the systems and/or methods is described in FIG. 1, it will be apparent that the above description is merely an example implementation and in practice, the systems and/or methods may function differently than what is shown in FIG. 1 and described above.

Figure 2:
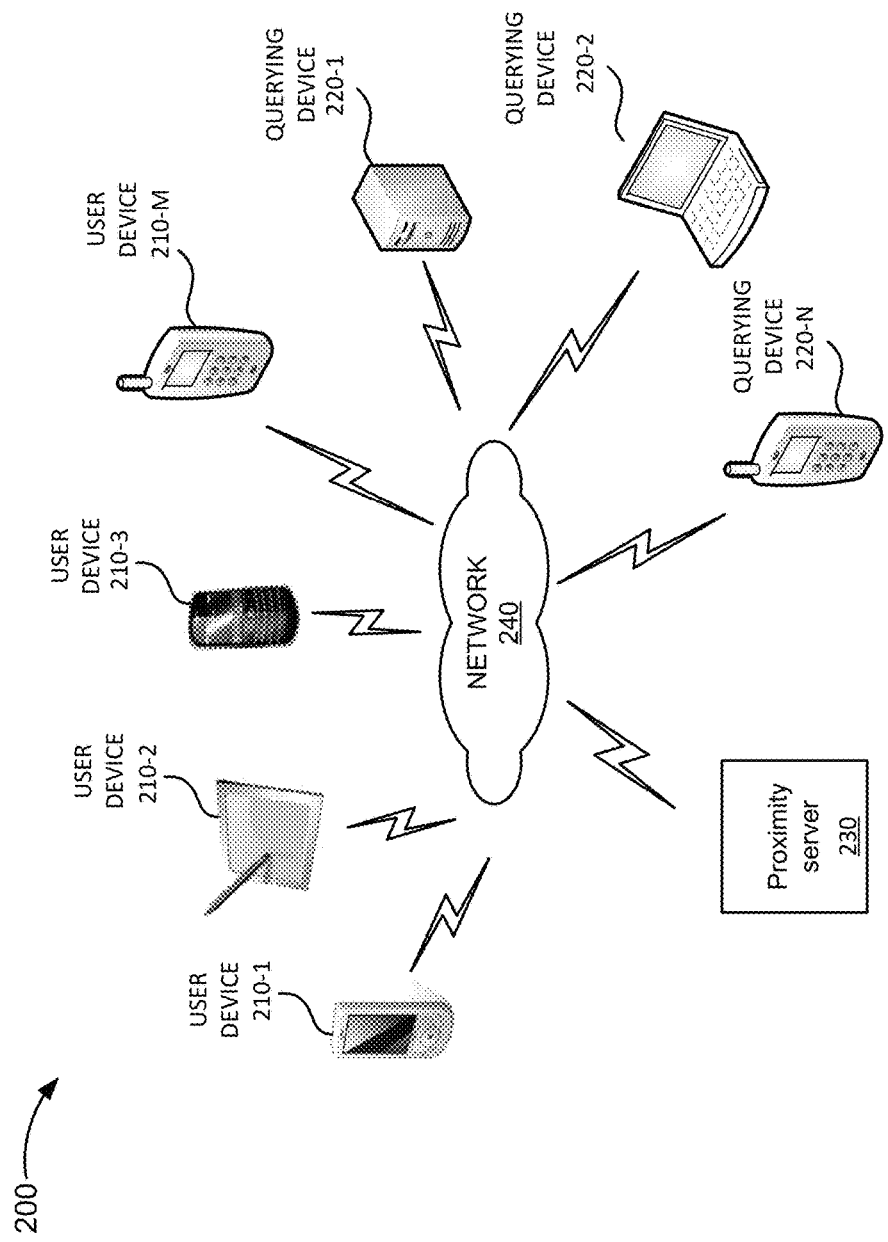
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1 through 210-M (where M≥1), querying devices 220-1 through 220-N (where N≥1), (also referred to as "querying server 220"), proximity server 230, and network 240.

User device 210 may include any portable user device capable of communicating via a network, such as network 240, a cellular network, an LTE network, or some other network. For example, user device 210 may correspond to a mobile communication device (e.g., a smart phone or a personal digital assistant (PDA)), a portable computer device (e.g., a laptop or a tablet computer), a gaming device or another type of portable user device. In some implementations, user device 210 may communicate with proximity server 230 and/or network 240 in order to provide proximity server 230 with geographic location information and with permissions information associated with querying device 220.

Querying device 220 may include any portable or non-portable device capable of communicating via a network, such as network 240, a cellular network, an LTE network, or some other network. For example, querying device 220 may correspond to a mobile communication device (e.g., a smart phone or a personal digital assistant (PDA)), a portable computer device (e.g., a laptop or a tablet computer), a gaming device, a desktop sever, a rack-mountable server, a credit/debit card processing device, a sensor, a fraud detection server, or another type of querying device. In some implementations, querying device 220 may function as a device to identify a proximity confidence value associated with a particular user device 210. For example, querying device 220 may communicate with proximity server 230 in order to provide proximity server 230 with a proximity query (e.g., a device ID of a particular user device 210, a geographic radius, longitude and latitude coordinates, and/or some other information related to a particular proximity). In some implementations, user device 210 may function as querying device 220 and querying device 220 may function as a user device 210. Additionally, or alternatively, user device 210 may function as both a user device 210 and as a querying device 220.

Proximity server 230 may include a computing device, such as a server device or a collection of server devices. In some implementations, proximity server 230 may communicate with user device 210 and/or network 240 to receive geographic location information, permissions information, and/or some other information. Additionally, or alternatively, proximity server 230 may communicate with querying device 220 to receive a proximity query for user device 210 and may provide proximity information (e.g., proximity confidence values, proximity maps, historical proximity information, traffic information, weather information, public service announcements, public health announcements, etc.) to querying device 220 based on receiving the proximity query and based on authorizing querying device 220 to receive the proximity information.

Network 240 may include one or more wired and/or wireless networks. For example, network 240 may include a cellular network, a public land mobile network (PLMN), a second generation (2G) network, a third generation (3G) network, a fourth generation (4G) network, a fifth generation (5G) network, and/or another network. Additionally, or alternatively, network 240 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or combination of these or other types of networks.

In some implementations, user device 210, querying device 220, and/or proximity server 230 may communicate via network 240 using a hypertext transfer protocol (HTTP), an HTTP secure (HTTPS) protocol, and/or some other type of protocol.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
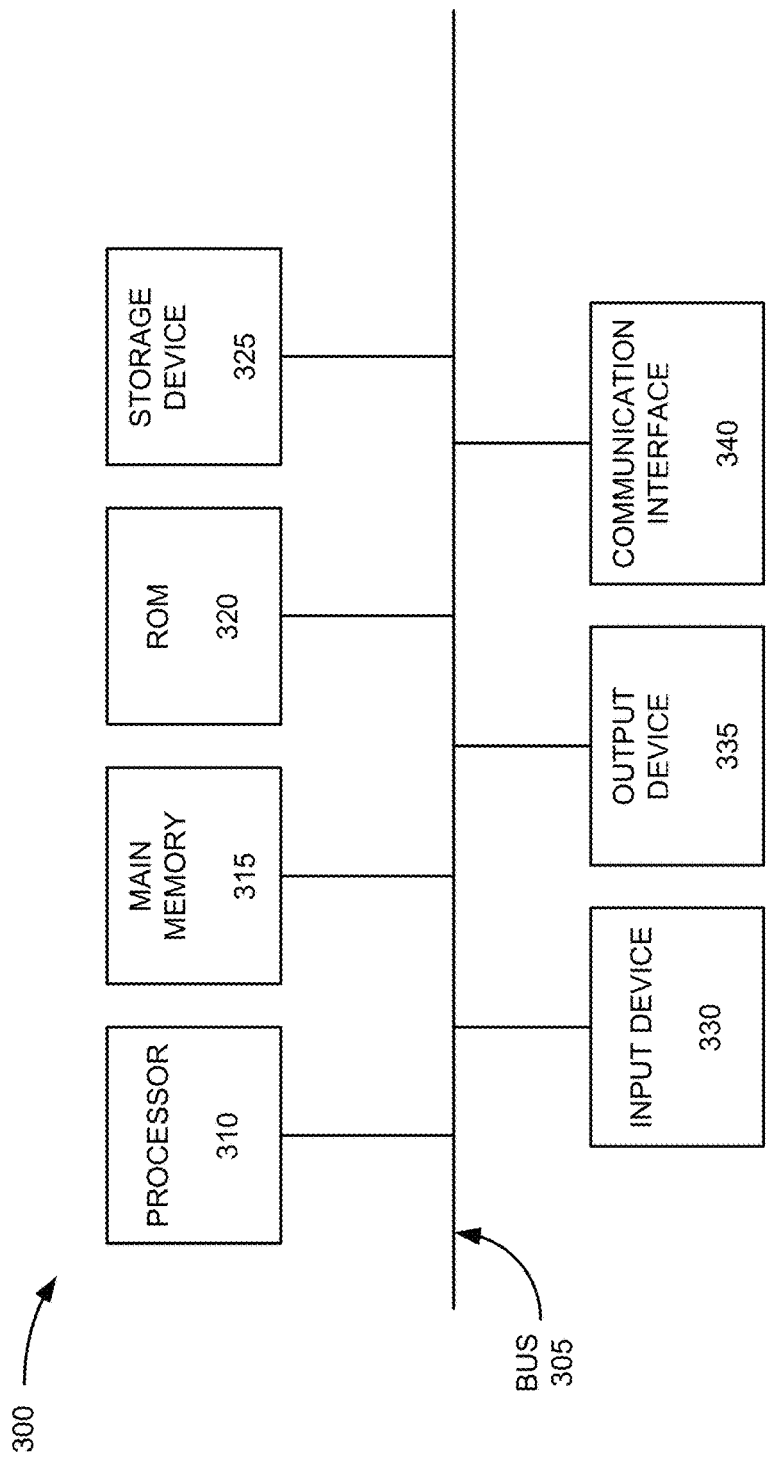
FIG. 3 illustrates example components of a device that may be used within the environment of FIG. 2.

FIG. 3 illustrates example components of a device 300 that may be used within environment 200 of FIG. 2. Device 300 may correspond to user device 210, querying device 220, and/or proximity server 230. Each of user device 210, querying device 220, and/or proximity server 230 may include one or more devices 300, and/or one or more components of device 300.

As shown in FIG. 3, device 300 may include a bus 305, a processor 310, a main memory 315, a read only memory (ROM) 320, a storage device 325 (also referred to as a local storage device or local storage), an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like mechanism that enables device 300 to communicate with other devices or networks. In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical storage device or spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

While FIG. 3 shows device 300 having a particular set of components, in some implementations, device 300 may include additional components, fewer components, different components, or differently arranged components.

Figure 4:
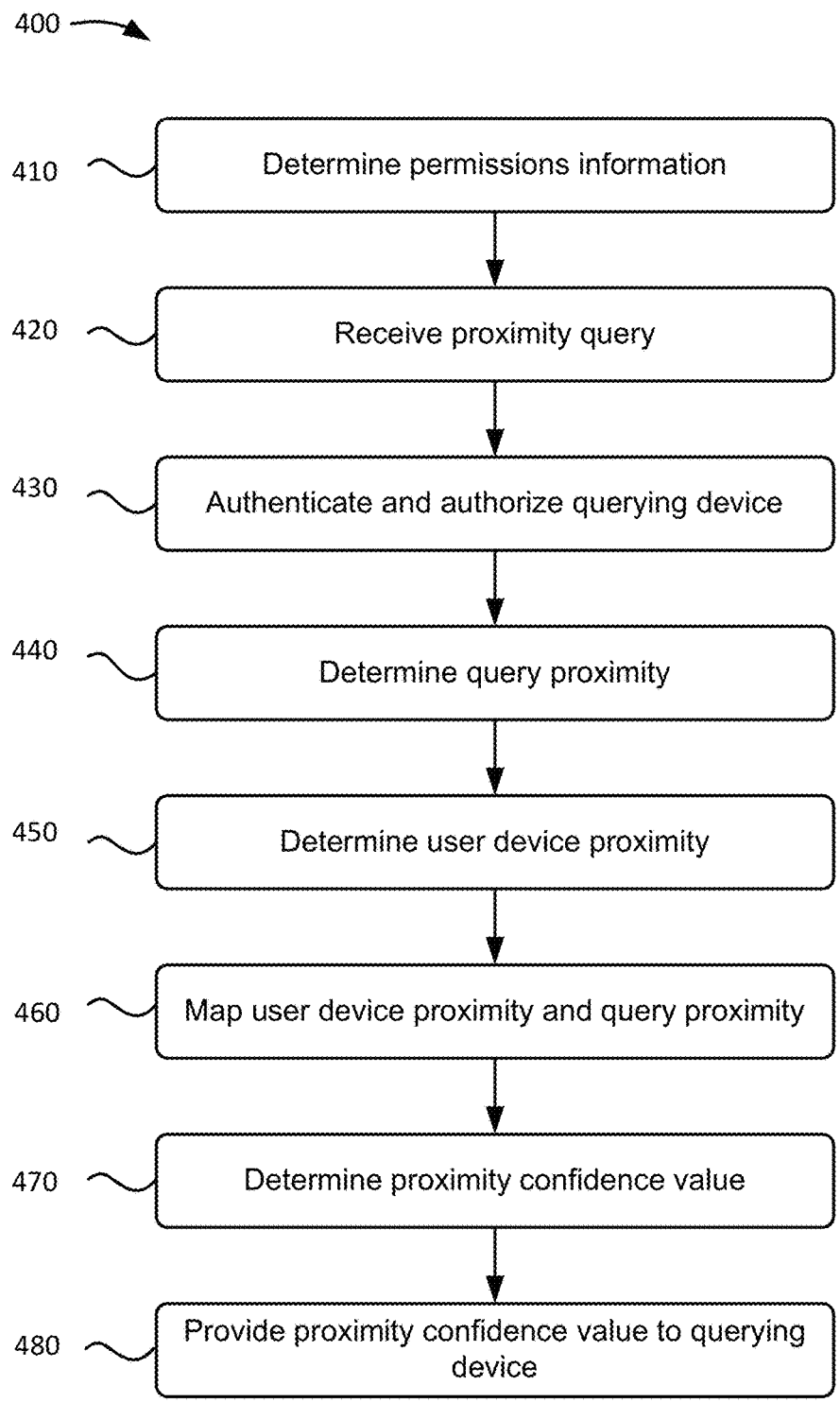
FIG. 4 is a flowchart of an example process for determining a proximity confidence value.

FIG. 4 illustrates a flowchart of an example process 400 for determining a proximity confidence value. In one implementation, process 400 may be performed by one or more components of proximity server 230. In another implementation, some or all of blocks of process 400 may be performed by one or more components of another device in environment 200 (e.g., user device 210 and/or querying server 220), or a group of devices including or excluding proximity server 230.

As shown in FIG. 4, process 400 may include determining permissions information (block 410). For example, proximity server 230 may receive permissions information, associated with querying server 220, from user device 210. Additionally or alternatively, proximity server 230 may automatically determine permissions information based on information stored by user device 210. For example, proximity server 230 may automatically determine permission levels for querying servers 220 associated with user device 210 (e.g., querying servers 220 associated with an address book application of user device 210, querying servers 220 that are frequently contacted by user device 210, querying servers 220 having a social networking relationship with user device 210, and/or querying servers 220 having some other type of association with user device 210).

In some implementations, the permissions information may determine whether querying server 220 is authorized to receive proximity information associated with user device 210 (e.g., proximity confidence values, user device proximity maps, etc.). Additionally, or alternatively, the permissions information may identify the frequency at which querying server 220 may receive proximity information associated with user device 210. For example, the permissions information may identify that querying server 220 may receive permissions information once a minute, once an hour, once a day, once a week, etc., or no more frequently that once a month, once an hour, once a day, once a week, etc.

Additionally, or alternatively, the permissions information may identify the accuracy of the proximity information associated with user device 210 that may be used to generate a proximity confidence value. For example, user device proximity may be more accurate (e.g., have a smaller radius) for querying servers having a high level of trust and may be less accurate (e.g., have a larger radius) for querying servers having a low level of trust.

Process 400 may also include receiving a proximity query (block 420). For example, proximity server 230 may receive a proximity query from querying server 220, (e.g., a requesting application, associated with querying server 220, such a fraud detection application). In some implementations, the proximity query may include information, such as an identifier associated with user device 210, a geographic radius, and/or information regarding a geographic position (e.g., a geographic location). In some implementations, the information regarding the geographic position may include an internet protocol (IP) address, a physical address, longitude and latitude coordinates, and/or some other information regarding a geographic position. In some implementations, the proximity query may be provided to proximity server 230 to allow proximity server 230 to identify the likelihood that user device 210 is within the radius of the position specified by the proximity query.

In some implementations, a user, associated with querying server 220, may cause querying server 220 to provide a proximity query to proximity server 230 (e.g., via a user interface associated with querying server 220). Alternatively, querying server 220 may automatically (e.g., without user interaction) provide a proximity query to proximity server 230 based on querying server 220 entering a particular geographic location.

Process 400 may further include authenticating and authorizing querying server 220 (block 430). For example, proximity server 230 may authenticate querying server 220 based on receiving a proximity query from querying server 220 to verify that the proximity query was received from querying server 220. For example, proximity server 230 may initiate an authentication function and may utilize an authentication protocol (e.g. a challenge-handshake authentication protocol (CHAP), a challenge-response authentication mechanism (CRAM), a diameter protocol, or some other type of authentication protocol) to verify an identity associated with querying server 220. In some implementations, proximity server 230 may authorize querying server 220 to receive proximity information for user device 210 based on permissions information. For example, proximity server 230 may identify whether querying server 220 has a sufficient trust level to receive proximity information.

Additionally, or alternatively, proximity server 230 may determine whether querying server 220 may receive proximity information based on permissions information relating to the frequency at which querying server 220 may receive proximity information. For example, as described above, permissions information may allow querying server 220 to receive proximity information at a particular frequency (e.g., once a day, once a week, etc.). Proximity server 230 may identify whether querying server 220 is within a threshold relating to the frequency in which querying server 220 may receive proximity information.

Process 400 may also include determining a query proximity (block 440). For example, proximity server 230 may determine the query proximity based on authenticating and authorizing querying server 220 and based on information included in the proximity query. As described above, the query proximity may include a circular proximity having a center associated with a geographic position and having a radius associated with a geographic radius. In some implementations, proximity server 230 may identify the geographic position of the query proximity based on the information regarding the geographic position included in the proximity query (e.g., a physical address, an IP address, longitude/latitude coordinates, etc.). In some implementations, proximity server may identify the geographic radius of the query proximity based on information regarding the geographic radius included in the proximity query (e.g., a radius specified by querying server 220).

Process 400 may further include determining user device proximity (block 450). As described above, user device proximity may relate to a circular proximity having a center associated with a geographic position and a radius associated with a geographic radius. In some implementations, the user geographic position and geographic radius of the user device may be based on information provided by a GPS of the user device and/or based on information regarding cellular towers with which the user device is connected. In some implementations, proximity server 230 may determine user device proximity based on "coarse" location information of user device 210 (e.g., an IP address associated with user device 210, information regarding cellular network devices in which user device 210 is connected with, etc).

Alternatively, proximity server 230 may determine user device proximity based on "fine" location information, such as information provided by a GPS of user device 210.

Alternatively, proximity server 230 may determine user device proximity based on permissions information. For example, proximity server 230 may reduce the accuracy of the user device proximity (e.g., increase the geographic radius of the user device proximity, or alter the geographic position of the user device proximity) based on information identifying a low permissions level (e.g., unknown querying servers 220, black-listed querying server 220, etc.) associated with querying server 220. In some implementations, proximity server 230 may obfuscate user device proximity based on receiving an instruction from user device 210 to reduce the accuracy of the user device proximity or to alter the position of the user device proximity.

Process 400 may also include mapping the user device proximity and the query proximity (block 460). For example, proximity server 230 may generate a geographic map having the user device proximity and the query proximity based on proximity server 230 determining the user device proximity and the query proximity, as described above. An example of a geographic map having the user device proximity and the query proximity is described above with respect to FIG. 1 and is further described below with respect to FIGS. 5A-5D.

Process 400 may further include determining a proximity confidence value (block 470). For example, proximity server 230 may determine a proximity confidence value based on generating the geographic map having the user device proximity and the query proximity. In some implementations, the proximity confidence value may be based on geographic areas that are common to the user device proximity and query proximity. Some examples of determining proximity confidence values are described below with respect to FIGS. 5A-5D.

Process 400 may also include providing the proximity confidence value to querying server 220 (block 480). For example, proximity server 230 may provide the proximity confidence value to querying server based on determining the proximity confidence value and based on authorizing querying server 220. In some implementations, proximity server 230 may provide information regarding user device proximity for display on a mapping application of querying server 220.

In some implementations, proximity server 230 may provide some other proximity information, associated with a particular proximity, including or excluding proximity confidence values to querying server 220. For example, proximity server 230 may provide proximity information for a particular proximity, such as historical proximity information (e.g., an amount of time user device 210 spent in the particular proximity), traffic information within the particular proximity, weather information within the particular proximity, public service announcements within the particular proximity, public health announcements within the particular proximity, etc. when querying server 220 enters a geographic area associated with the particular proximity.

While a particular series of blocks have been described above with regards to FIG. 4, the order of the blocks may be modified in other implementations. Further, non-dependent blocks may be performed in parallel.

FIGS. 5A-5D illustrate example implementations as described herein. In some implementations, FIGS. 5A-5D may correspond to block 460-470 of process 400 and may describe possible proximity confidence values associated with a user device proximity and a query proximity. In FIGS. 5A-5D, assume that proximity server 230 determines a user device proximity and determines a query proximity as described above. Further assume that proximity server 230 generates a map having the user device proximity and the query proximity as shown in FIGS. 5A-5D.

In FIGS. 5A-5D, $P_D$ may identify a position or center of a user device proximity, $R_D$ may identify a radius of a user device proximity, $P_Q$ may identify a position or center of a query proximity, and $R_Q$ may identify a radius of a query proximity.

Figure 5A:
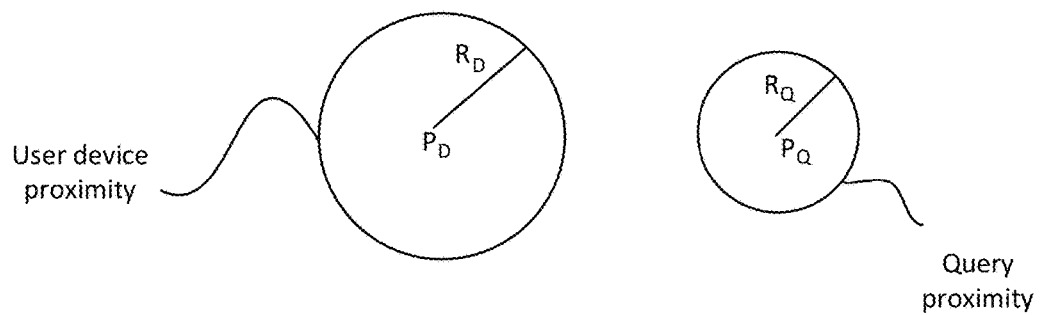
FIGS. 5A-5D illustrate an example implementation for calculating a proximity confidence score.

In one example implementation, and as shown in FIG. 5A, the user device proximity may not intersect or share any portion with the query proximity. In this case, proximity server 230 may determine a proximity confidence value based on the formula $0/A_D$, where $A_D$ is the area of the user proximity. As shown in FIG. 5A, the proximity confidence may be 0% since the user device proximity is not shared with the query proximity.

In some implementations, proximity server 230 may determine that the user device proximity may not intersect or share any portion with the query proximity when $D_P \geq S_r$, where $D_P$ is a distance between $P_D$ and $P_Q$ and $S_r$ is the sum of $R_D$ and $R_Q$. In some implementations, the distance between $P_D$ and $P_Q$ may be determined based on the Hasversine formula.

Figure 5B:
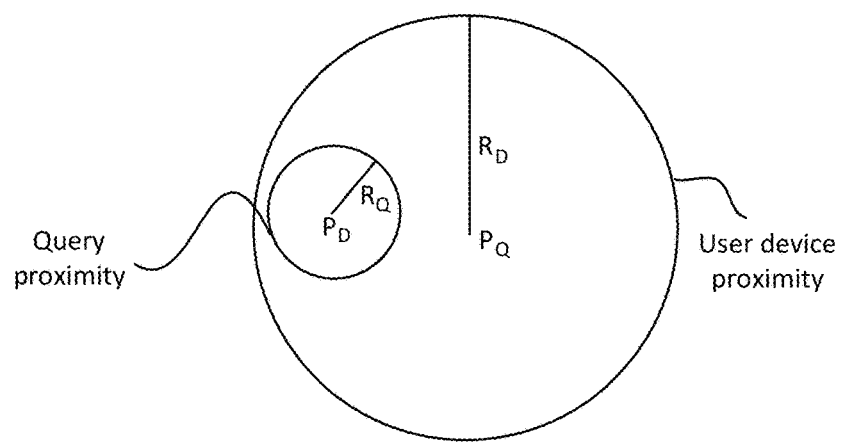

In another example implementation, and as shown in FIG. 5B, the user device proximity may completely overlap the query proximity. In this case, proximity server 230 may determine a proximity confidence value based on the equation: Proximity Confidence=$(R_Q^2)/(R_D^2)$ where $R_Q$ is the radius of the query proximity and $R_D$ is the radius of user device proximity. In one example, proximity server 230 may determine a proximity confidence of 1% when $R_Q=10$ meters and $R_D=100$ meters.

In some implementation, proximity server 230 may determine that the user device proximity may completely overlap the query proximity when $D_p \leq D_r$ and when $R_Q \leq R_D$ where $D_p$ is the distance between $P_D$ and $P_Q$, $D_r$ is the difference between $R_D$ and $R_Q$.

Figure 5C:
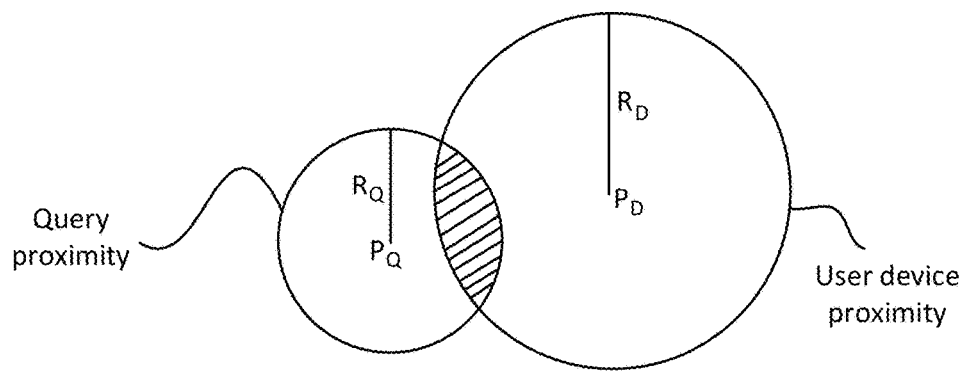

In another example implementation, and as shown in FIG. 5C, a portion of the user device proximity may be shared with a portion of the query proximity. In this case, proximity server 230 may determine a proximity confidence value based on the shared portion (i.e., the shaded portion shown in FIG. 5C) and based on equation: Proximity Confidence= (area of shared portion)/$(\pi *R_D^2)$ where $R_D$ is the radius of user device proximity and $\pi$ is approximately equal to 3.14159. In some implementations, proximity server 230 may determine the area of the shared portion based on the distance between points $P_D$ and $P_Q$, where $P_D$ is the center of the user device proximity and $P_Q$ is the center of the query proximity, and based on $R_D$ and $R_Q$. In some implementations, the area of the shared portion based on a formula, such as Area=$R_D^2 * \cos^{-1}((P_D+R_D^2-R_Q^2)/2*P_D*R_D)+R_Q^2*\cos^{-1} ((P_D^2+R_Q^2-R_D^2)/(2*P_D*R_Q))-(0.5*\text{sqrt}((-P_D+R_D+R_Q) (P_D+R_D-R_Q)(P_D-R_D+R_Q)(P_D+R_D+R_Q)))$, where $R_D$ is the radius of the user device proximity, $P_D$ is the position of the center of the user device proximity, $R_Q$ is the radius of the query proximity, and $P_Q$ is the position of the center of the query proximity.

Figure 5D:
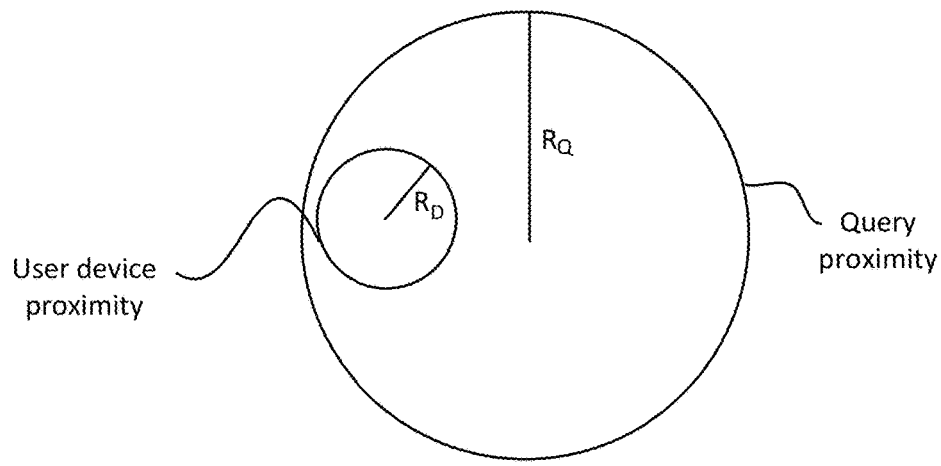

In another example implementation, and as shown in FIG. 5D, the query proximity may completely overlap the user device proximity. In this case, proximity server 230 may determine a proximity confidence value based on the equation: Proximity Confidence=$A_D/A_D=1$. In some implementations the proximity confidence may be equal to 100% since the user device proximity is completely within the query proximity.

In some implementations, proximity server 230 may determine that when $D_p \leq D_r$ and when $R_Q > R_D$, where $D_p$ is the distance between $P_D$ and $P_Q$, $D_r$ is the difference between $R_D$ and $R_Q$.

While particular examples are shown in FIGS. 5A-5D, it will be apparent that the above description is merely an example implementation of proximity server 230 mapping query proximities and device proximities. In practice, proximity server 230 may map query proximities and device proximities in some other format than what is shown in FIGS. 5A-5D.

Figure 6:
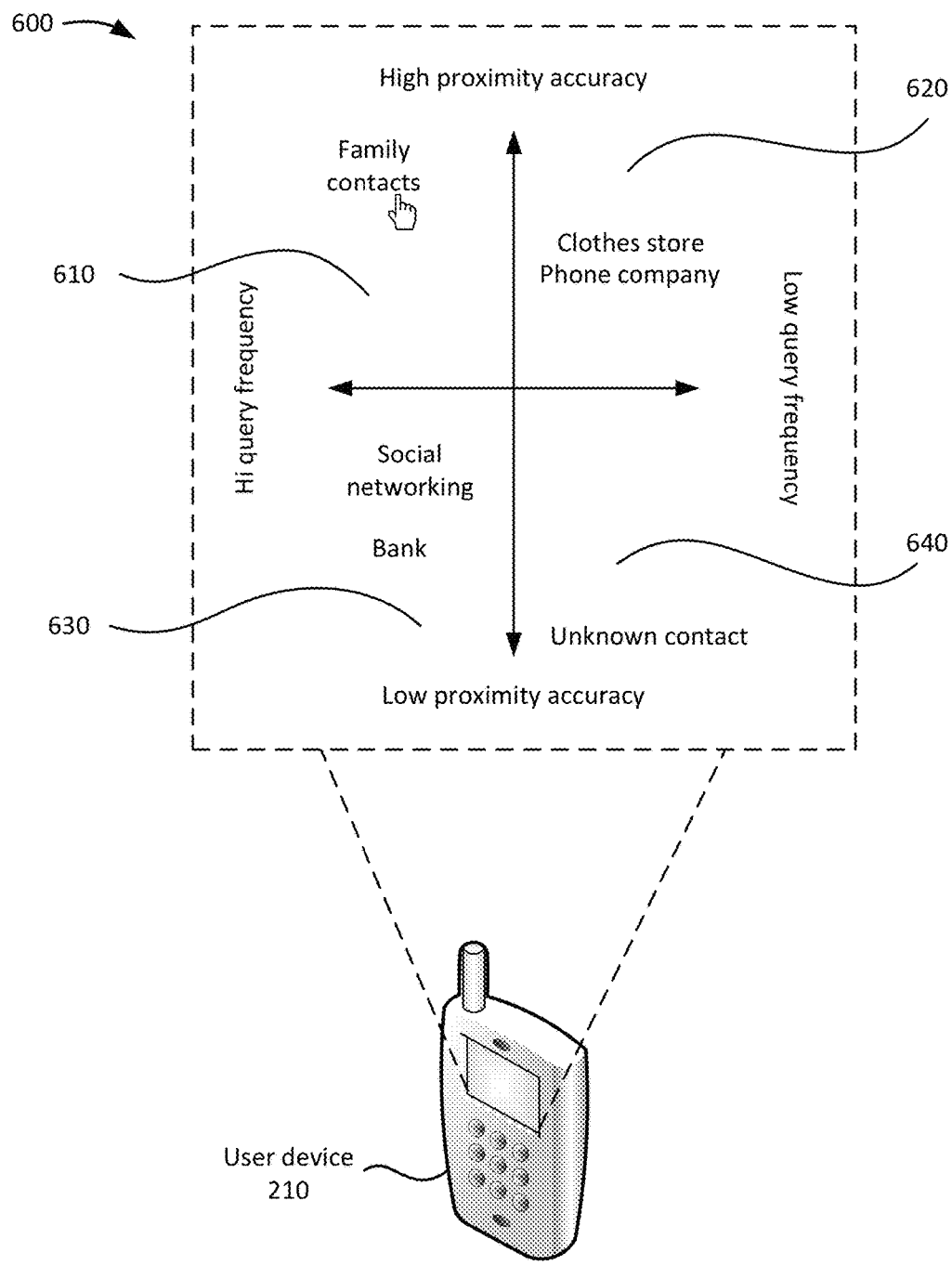
FIGS. 6-8 are diagrams illustrating example implementations as described herein.

FIG. 6 illustrates an example implementation as described herein. In some implementations, FIG. 6 may correspond to an example user interface of user device 210 for providing proximity server 230 with permissions information for querying servers 220. As shown in FIG. 6, interface 600 may include information identifying querying servers 220 which may have permissions to receive proximity confidence values based on different user device proximity accuracy levels. As further shown in FIG. 6, interface 600 may include section 610, section 620, section 630, and section 640. In some implementations, each one of sections 610-640 may include information for one or more querying servers 220 (e.g., a device ID, a nickname, such as "family contacts" or "phone company," or some other identifier to identify querying server 220) and may relate to user device proximity accuracy permissions and query frequency permissions.

In some implementations, query frequency may prevent querying server 220 from "zeroing in" on a geographic location associated with user device 210 by authorizing querying server 220 to receive proximity information less than a specified frequency (e.g., no more frequently than once a minute, once an hour, once a day, etc.). Alternatively, user device 210 may specify a query frequency to prevent querying server 220 from receiving proximity information all together.

In one example, section 610 may identify querying servers 220 (e.g., querying servers 220 associated with family contacts) which may receive proximity information (e.g., proximity confidence values, proximity maps, etc.) based on a high user device proximity accuracy and which may have authorization to receive proximity information frequently.

Continuing with the above example, section 620 may identify querying servers 220 (e.g., querying servers 220 associated with a clothes store and a phone company) which may receive proximity confidence values based on a high user device proximity accuracy and which may have authorization to receive proximity confidence values infrequently. Section 630 may identify querying servers 220 which may receive proximity information based on a low user device proximity accuracy and which may have authorization to receive proximity information frequently. Section 640 may identify querying servers 220 (e.g., querying servers 220 associated with unknown parties) which may receive proximity information based on a low user device proximity accuracy and which may have authorization to receive proximity information infrequently.

While a particular format of interface 600 is shown in FIG. 6, in practice, interface 600 may appear differently than what is shown in FIG. 6. Additionally, or alternatively, interface 600 may include additional sections, fewer sections, or differently arranged sections than what are shown in FIG. 6.

While proximity accuracy and query frequency are described in terms of "high" and "low" degrees, in practice, "high proximity accuracy," "low proximity accuracy," "high query frequency," and "low query frequency" may be defined based on specific threshold values or may be used to describe proximity accuracy and query frequency on a relative scale. For example, "high proximity accuracy" may correspond to a proximity within a 5-meter radius (e.g., "street-level" accuracy), "low proximity accuracy" may correspond to a proximity within a 5000-meter radius (e.g., "city-level" accuracy). In some implementations, "high query frequency" may correspond to a frequency of unlimited quantity of queries, or no more than one query per minute. "Low query frequency" may correspond to a frequency of no more than one query per day or one query per week, etc.

Figure 7:
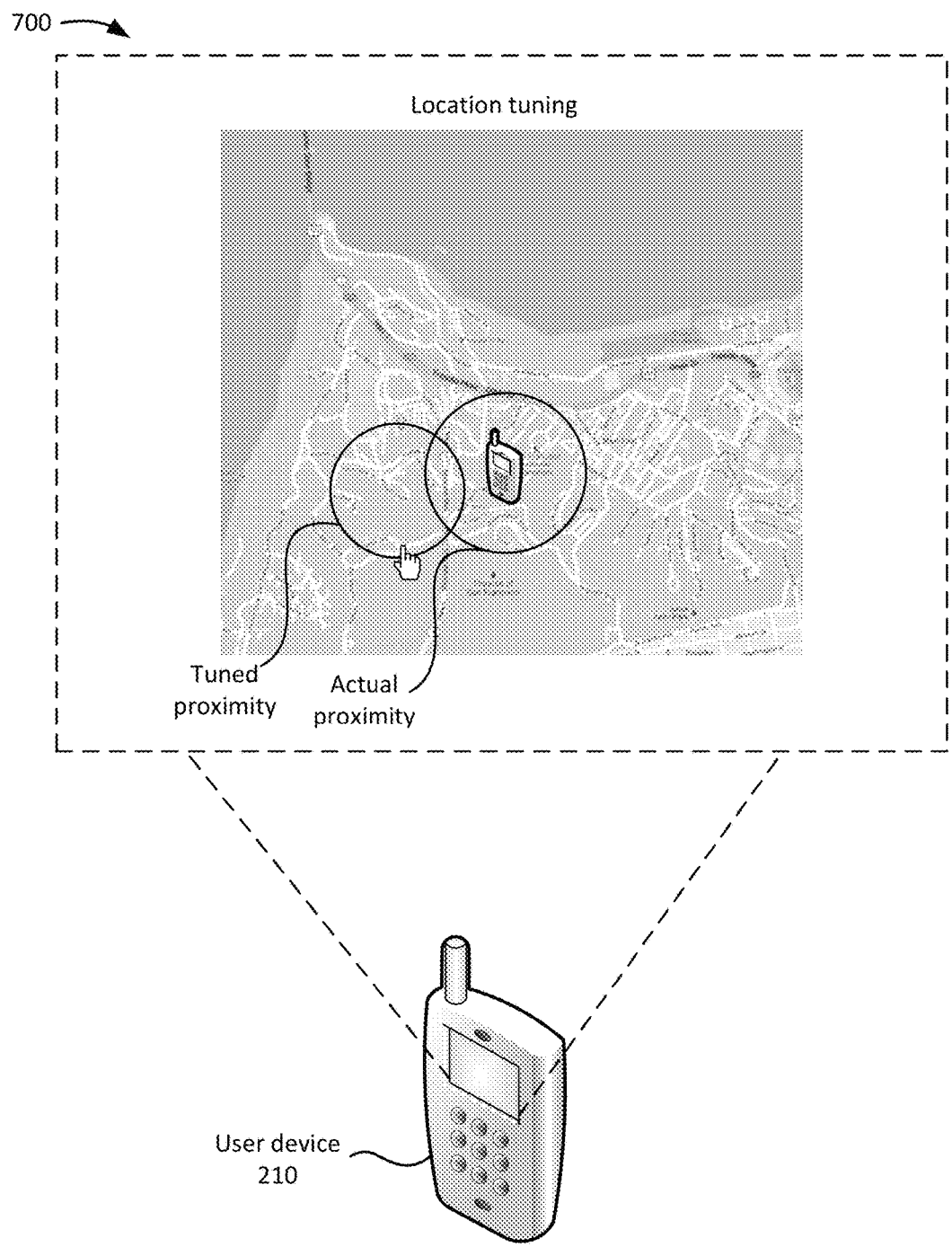

FIG. 7 illustrates an example implementation as described herein. In some implementations, FIG. 7 may correspond to an example user interface of user device 210 for providing proximity server 230 with a tuned or altered user device proximity. As shown in FIG. 7, interface 700 may include a geographic map having an indication identifying an actual geographic proximity associated with user device 210. In some implementations, a user, associated with user device 210, may provide user device 210 with a tuned proximity by selecting a point on the geographic map of interface 700 to generate the tuned proximity on the geographic map. In some implementations, the user may select to move the position of the tuned proximity and may select to alter the radius of the tuned proximity (e.g., to increase or decrease the accuracy of the tuned proximity).

In some implementations, the tuned proximity may allow the user to increase or decrease the accuracy and/or the position of the user device proximity, thereby affecting a corresponding proximity confidence value based on the user device proximity. For example, the tuned proximity may be used to decrease the accuracy of the user device proximity for a particular querying server 220 (e.g., an untrusted querying server 220) by increasing the radius of the tuned proximity. Additionally, or alternatively, the tuned proximity may be used to increase the accuracy of the user device proximity for some other querying server 220 (e.g., a trusted querying server 220) by reducing the radius of the tuned proximity.

In some implementations, user device 210 may receive "tags" via interface 700. For example, user device 210 may receive tags associated with a particular geographic location, such as timestamps, customized descriptions, information regarding a particular querying server 220, and/or some other information. In some implementations, the tags may be used to provide user device 210 with alerts and/or with information regarding particular geographic proximities when user device 210 and/or querying server 220 enters the geographic proximities. For example, user device 210 may receive a tag with traffic information for a particular geographic proximity and may provide information regarding the tag to proximity server 230 to allow querying server 220 to receive the traffic information when querying server 220 enters the geographic proximity.

While a particular format of interface 700 is shown in FIG. 7, in practice, interface 700 may appear differently that what is shown in FIG. 7.

Figure 8:
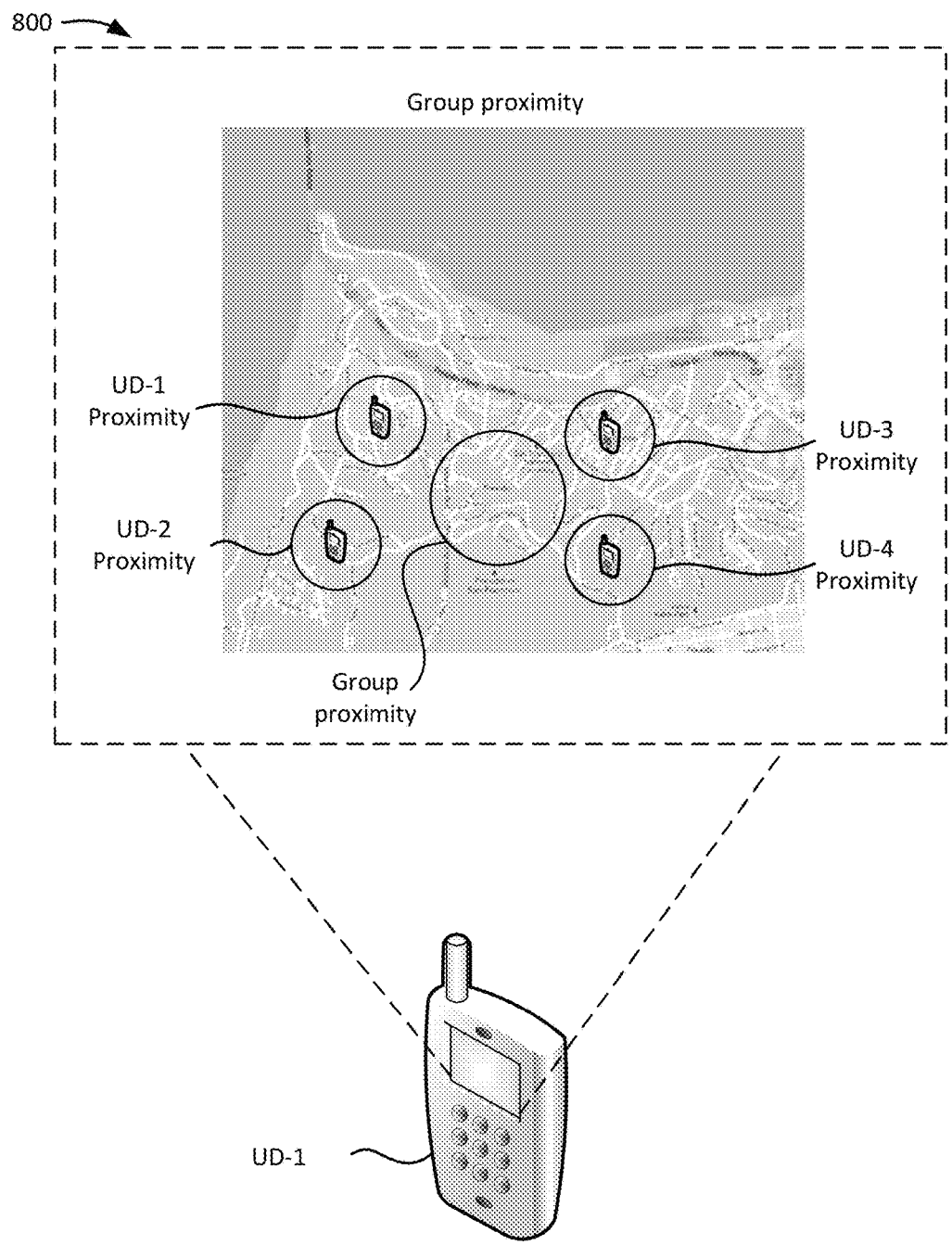

FIG. 8 illustrates an example implementation as described herein. In some implementations, FIG. 8 may correspond to an example user interface of user device 210 for displaying group proximity information (e.g., a proximity that is central to multiple user devices 210). As shown in FIG. 8, interface

800 may include a geographic map having indications identifying proximity information for multiple user devices (e.g., UD-1, UD-2, UD-3, and UD-4). For example, assume that UD-2, UD-3, and UD-4 each provide permissions to proximity server 230 to authorize UD-1 to receive proximity information regarding UD-2, UD-3, and UD-4. UD-1 may function as a querying device 220 to communicate with proximity server 230 to receive proximity information for UD-2, UD-3, and UD-4. UD-1 may display the proximity information for UD-1, UD-2, UD-3, and UD-4 on interface 800 and may determine information regarding a group proximity that is central to UD-1, UD-2, UD-3, and UD-4. For example, proximity server may use an algorithm to determine the group proximity associated with the proximities of UD-1, UD-2, UD-3, and UD-4 such that group proximity is within a particular threshold distance of the proximities of UD-1, UD-2, UD-3, and UD-4. In some implementations, respective users of UD-1, UD-2, UD-3, and UD-4 may designate a meeting point based on the group proximity.

While a particular format of interface 800 is shown in FIG. 8, in practice, interface 700 may appear differently that what is shown in FIG. 8. Further, while proximity information for a particular number of user devices 210 is shown in interface 800, in practice, interface 800 may include proximity information for any number of user devices 210.

Figure 9A:
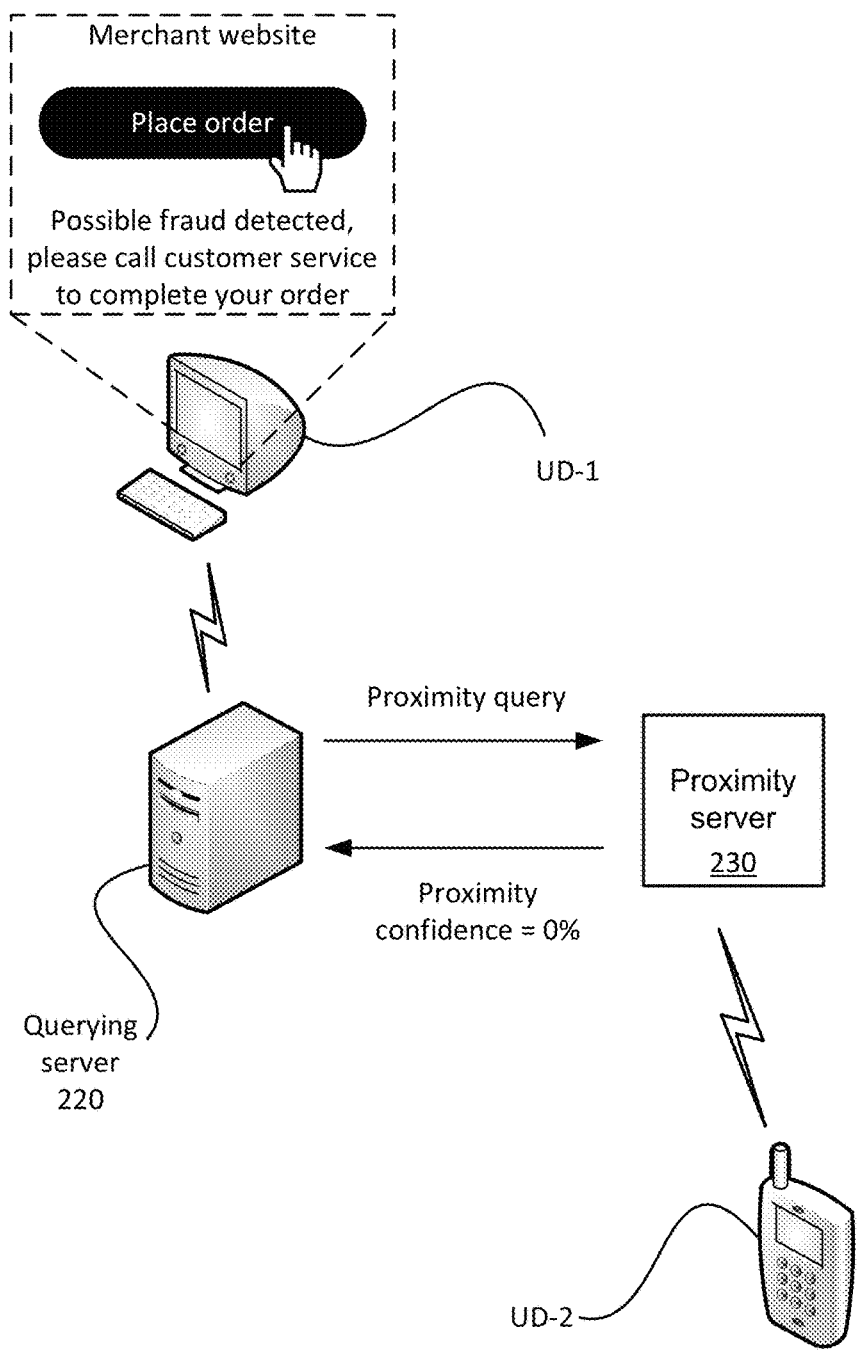
FIGS. 9A-9B are diagrams illustrating example implementations as described herein.
Figure 9B:
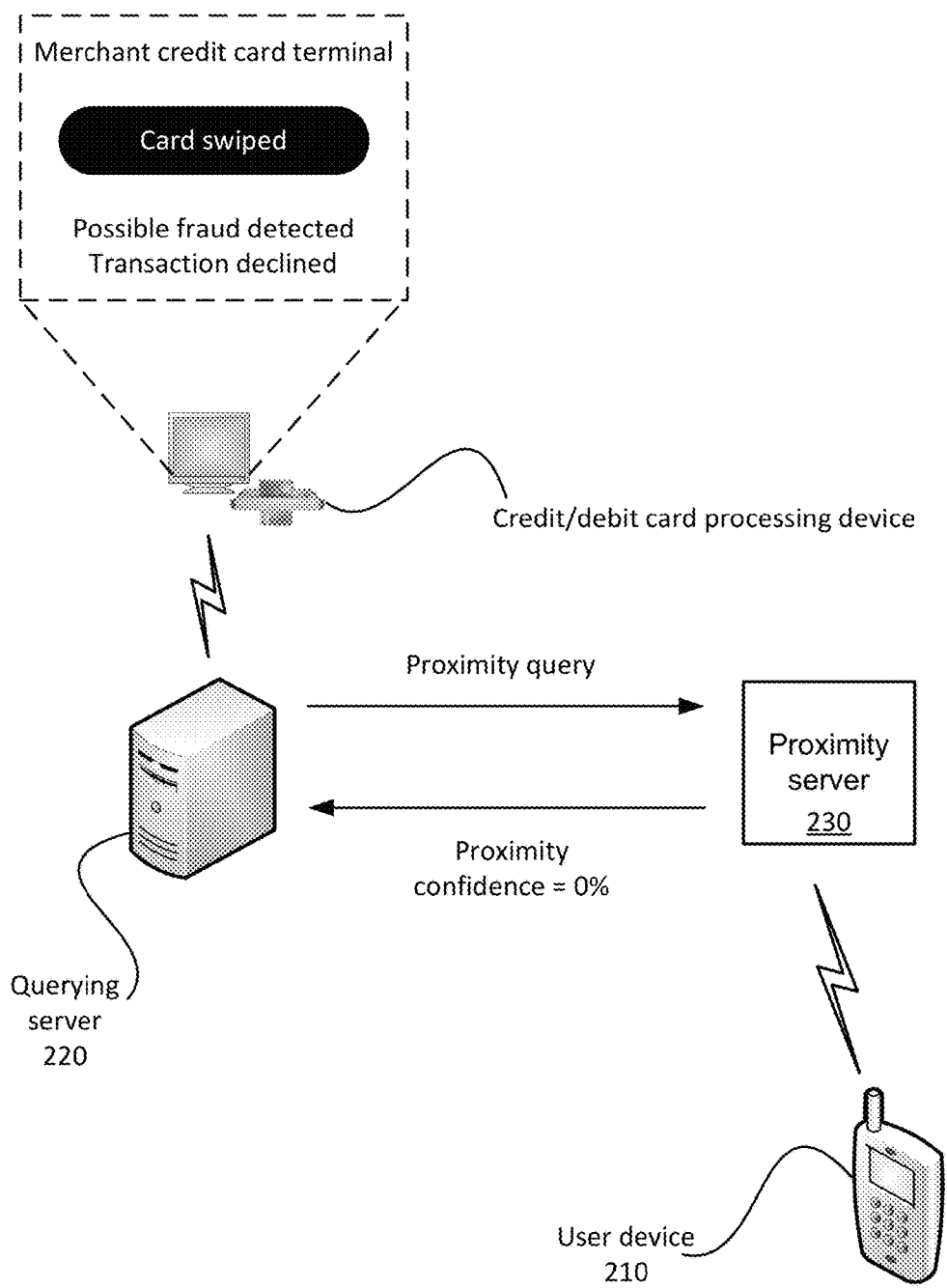

FIGS. 9A-9B illustrate example implementations as described herein. In FIG. 9A, querying server 220 may detect unauthorized use of payment information based on a proximity confidence value relating to the likelihood that a first user device 210 (e.g., UD-1), used to make a payment, is within a particular radius of a second user device (UD-2) associated with an authorized user of the payment information. For example, querying server 220 may detect unauthorized use of payment information when UD-2 is not in the proximity of the payment location (e.g., a user, associated with UD-2 and associated with the payment information is not in the proximity of the location in which the payment information is being used).

In FIG. 9A, assume that querying server 220 is associated with an online merchant (e.g., a merchant that receives information for product orders via a network, such as network 240) and/or with a fraud detection server. Further assume that proximity server 230 stores permissions information to authorize querying server 220 to receive proximity information for UD-2.

In some implementations, querying server 220 may store account related information for a user to allow the user to make a payment to place an order with the merchant via UD-1 (e.g., via a web browser or some other interface of UD-1). For example, querying server 220 may store account related information, such as authentication credentials (e.g., a username and password), billing and/or payment information (e.g., credit/debit card information) associated with the authentication credentials, and/or some other account related information. Additionally, querying server 220 may store information regarding UD-2 associated with the authentication credentials and associated with the payment information.

As shown in FIG. 9A, UD-1 may communicate with querying server 220 to place an order with the online merchant associated with querying server 220. For example, UD-1 may provide querying server 220 with authentication credentials (e.g., a username and password) such that querying server 220 may identify billing and/or payment information associated with the authentication credentials. Additionally, querying server 220 may identify information regarding UD-2 based on the authentication credentials. In some implementations, querying server 220 may identify an IP address of UD-1 and provide a proximity query to proximity server 230.

In some implementations, the proximity query may include the IP address, the information regarding UD-2 (e.g., a device ID), and a particular radius (e.g., 500 meters, or some other radius). The proximity query may be provided to proximity server 230 to identify a proximity confidence value relating to the likelihood that UD-2 is within the particular radius of a geographic location associated with the IP address. As shown in FIG. 9A, querying server 220 may receive a proximity confidence value (e.g., 0%). In some implementations, querying server 220 may prevent an order from being placed and/or a payment being made when the proximity confidence value does not satisfy a particular threshold (e.g., a 75% threshold or some other threshold).

As shown in FIG. 9A, querying server 220 may prevent an order from being placed and may send an indication to UD-1 that the order has not been placed. As a result, querying server 220 may prevent an order from being placed when the proximity confidence value, relating to the likelihood that UD-2 (e.g., a user device 210 associated with payment information and an authorized user of the payment information), is within a particular radius of a geographic location associated with an IP address of UD-1 does not satisfy a particular threshold.

Continuing with the above example, and as shown in FIG. 9B, the proximity confidence value may prevent payments from being made in physical geographic locations in addition to preventing payments from being made from web locations. For example, as shown in FIG. 9B, a credit/debit card processing device may receive payment information from a payment medium (e.g., a credit/debit card).

As further shown in FIG. 9B, the credit/debit card processing device may provide the payment information to a querying server 220 (e.g., a fraud detection server). In some implementations, querying server 220 may identify a device identifier of a user device 210 associated with the payment information. As shown in FIG. 9B, querying server 220 may provide proximity server 230 with a proximity query including a physical location associated with querying server 220, a geographic radius (e.g., 500 meters) and a device identifier associated with user device 210 and with the payment information. Proximity server 230 may determine a proximity confidence value based on the query proximity and based on the user device proximity, as described above, and may provide the proximity confidence value to querying server 220. As a result, querying server 220 may prevent a payment when the proximity confidence value, relating to the likelihood that user device 210, associated with the payment information and associated with an authorized user of the payment information, is within a particular radius of a geographic location associated with querying server 220, does not satisfy a particular threshold. For example, querying server 220 may prevent the payment from being made when an unauthorized user provides the payment information to a merchant and when the unauthorized user is not in possession of user device 210 associated with an authorized user.

While particular example implementations of a proximity confidence value are described above with respect to FIGS. 9A-9B, in practice, the proximity confidence value may be implemented for purposes other than what is described in FIGS. 9A-9B.

As described above querying server 220 may receive a proximity confidence value that describes a confidence level relating to a likelihood that user device 210 is within the geographic proximity specified by querying server 220 and based on permission levels associated with querying server 220. In some implementations, payment information may be associated with user device 210 such that querying server 220 may detect possible instances of unauthorized payment activity as described above with respect to FIG. 9A-9B.

The foregoing description provides illustration and description, but is not intended to be exhaustive or to limit the possible implementations to the precise form disclosed. Modifications and variations are possible in light of the above disclosure or may be acquired from practice of the implementations. Further, non-dependent blocks may be performed in parallel.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a server, a query from a first device,
      the query including an identifier associated with a second device, information regarding a geographic radius, and information regarding a geographic position;
   determining, by the server, a first proximity, associated with the query, based on the information regarding the geographic radius and based on the information regarding the geographic position;
   automatically determining, by the server, permissions information regarding the first device,
      the permissions information including information relating to an authorized frequency at which proximity information, associated with the second device, is permitted to be provided to the first device;
   determining, by the server, a second proximity associated with the second device based on a geographic location of the second device;
   determining, by the server, a value based on a shared area that is common to the first proximity and the second proximity,
      the value indicating a likelihood that the first proximity is within the second proximity;
   providing, by the server, the proximity information to the first device based on the authorized frequency at which proximity information is permitted to be provided to the first device,
      the proximity information including the value;
   receiving, by the server, a group query from the second device;
   determining, by the server, user device proximities of a plurality of user devices,
      each user device proximity being determined based on a geographic location of a respective user device and a measure of accuracy permitted to be provided to the second device;
   determining, by the server, a group proximity based on the user device proximities and the second proximity,
      a radius and a position of the group proximity being determined such that the group proximity is central to the user device proximities and the second proximity, and such that the group proximity is within a threshold distance of each of the user device proximities and the second proximity,
      the group proximity being a geographic area; and
   providing, by the server, information indicating the group proximity to the second device based on the group query.

2. The method of claim 1, further comprising:
   determining an internet protocol (IP) address of the first device,
   where the information regarding the geographic position includes the IP address.

3. The method of claim 1, where the identifier, associated with the second device, is associated with payment information, the first device preventing usage of the payment information when the value does not satisfy a particular threshold.

4. The method of claim 1, further comprising:
   receiving information regarding the geographic location from the second device, the second device receiving the information regarding the geographic location via a user interface of the second device,
   where determining the second proximity is based on receiving the information regarding the geographic location.

5. The method of claim 1,
   where the permissions information includes information relating to a measure of accuracy associated with the second proximity, and
   where determining the second proximity is based on the permissions information.

6. The method of claim 1, further comprising:
   generating a geographic map having the first proximity and the second proximity; and
   determining the value based on generating the geographic map;
   where providing the proximity information to the first device includes providing the geographic map to the first device based on generating the geographic map.

7. The method of claim 1, further comprising:
   determining a meeting point based on the group proximity.

8. The method of claim 1, where automatically determining the permissions information comprises:
   obtaining association information from the second device, the association information indicating query devices, including the first device, that are contacted by the second device at a frequency that satisfies a threshold,
determining the permissions information based on the association information obtained from the second device.

9. The method of claim 1, further comprising:
moving the position of the second proximity away from the geographic location based on the first device being a black-listed device or a device unknown to the second device.

10. The method of claim 1, further comprising:
selectively altering the second proximity by moving a position of the second proximity away from the geographic location based on the permissions information.

11. A device comprising:
one or more processors to:
receive a query from a first device,
the query including an identifier, associated with a second device, information regarding a geographic radius, and information regarding a geographic position;
determine a first proximity, associated with the query, based on the information regarding the geographic radius and based on the information regarding the geographic position;
automatically determine permissions information regarding the first device,
the permissions information including information relating to an authorized frequency at which proximity information, associated with the second device, is permitted to be provided to the first device;
determine a second proximity associated with the second device based on a geographic location of the second device;
generate a geographic map having the first proximity and the second proximity;
determine a value based on a shared area representing a geographic area that is common to the first proximity and the second proximity,
the value indicating a likelihood that the first proximity is within the second proximity;
provide the proximity information to the first device based on the authorized frequency at which the proximity information is permitted to be provided to the first device,
the proximity information including the value and the geographic map;
receive a group query from the second device;
determine user device proximities of a plurality of user devices,
each user device proximity being determined based on a geographic location of a respective user device and a measure of accuracy permitted to be provided to the second device;
determine a group proximity based on the user device proximities and the second proximity,
a radius and a position of the group proximity being determined such that the group proximity is central to the user device proximities and the second proximity, and such that the group proximity is within a threshold distance of each of the user device proximities and the second proximity,
the group proximity being a geographic area; and
provide information indicating the group proximity to the second device based on the group query.

12. The device of claim 11, where the identifier, associated with the second device, is associated with payment information, the first device preventing usage of the payment information when the value does not satisfy a particular threshold.

13. The device of claim 11, where the one or more processors are further to:
determine the geographic location based on one or more network devices connected to the second device; or
determine the geographic location based on longitude and latitude coordinates associated with the second device via a global positioning system (GPS) of the second device,
where when determining the second proximity, the one or more processors are to:
determine the second proximity based on determining the one or more network devices connected to the second device or based on determining the longitude and latitude coordinates associated with the second device.

14. The device of claim 11, where the one or more processors are further to:
receive information regarding the geographic location from the second device,
the second device receiving the information regarding the geographic location via a user interface of the second device,
where when determining the second proximity, the one or more processors are to:
determine the second proximity based on receiving the information regarding the geographic location.

15. The device of claim 11,
where the permissions information includes information relating to a measure of accuracy associated with the second proximity, and
where when determining the second proximity, the one or more processors are to:
determine the second proximity based on the permissions information.

16. The device of claim 11, where the one or more processors are further to:
determine a meeting point based on the group proximity.

17. A non-transitory computer-readable medium comprising:
a plurality of instructions which, when executed by one or more processors, cause the one or more processors to:
receive a query from a first device,
the query including an identifier associated with a second device, information regarding a geographic radius, and information regarding a geographic position;
determine a first proximity, associated with the query, based on the information regarding the geographic radius and based on the information regarding the geographic position;
determine permissions information regarding the first device,
the permissions information including information relating to an authorized frequency at which proximity information, associated with the second device, is permitted to be provided to the first device and information relating to a measure of accuracy associated with a second proximity associated with the second device,
determine the second proximity, associated with the second device, based on the permissions information and a geographic location of the second device;

determine a value based on a shared area that is common to the first proximity and the second proximity,
the value indicating a likelihood that the first proximity is within the second proximity;
provide the proximity information to the first device based on the authorized frequency at which the proximity information may be provided to the first device,
the proximity information including the value;
receive a group query from the second device;
determine user device proximities of a plurality of user devices,
each user device proximity being determined based on a geographic location of a respective user device and a measure of accuracy permitted to be provided to the second device;
determine a group proximity based on the user device proximities and the second proximity,
a radius and a position of the group proximity being determined such that the group proximity is central to the user device proximities and the second proximity, and such that the group proximity is within a threshold distance of each of the user device proximities and the second proximity,
the group proximity being a geographic area; and
provide information indicating the group proximity to the second device based on the group query.

18. The non-transitory computer-readable medium of claim 17, where the plurality of instructions further cause the one or more processors to:
determine an internet protocol (IP) address of the first device,
where the information regarding the geographic position includes the IP address.

19. The non-transitory computer-readable medium of claim 17, where the identifier, associated with the second device, is associated with payment information, the first device preventing usage of the payment information when the value does not satisfy a particular threshold.

20. The non-transitory computer-readable medium of claim 17, where the plurality of instructions further cause the one or more processors to:
generate a geographic map having the first proximity and the second proximity; and
determine the value based on generating the geographic map;
where one or more instructions, of the plurality of instructions, to provide the proximity information to the first device include one or more instructions to provide the geographic map to the first device based on generating the geographic map.

21. The non-transitory computer-readable medium of claim 17, where the plurality of instructions further cause the one or more processors to:
determine a meeting point based on the group proximity.

* * * * *